United States Patent [19]
Albers, Jr.

[11] Patent Number: 5,309,869
[45] Date of Patent: May 10, 1994

[54] CATTLE STANCHION APPARATUS

[76] Inventor: Teo Albers, Jr., 13437 Mountain Ave., Chino, Calif. 91710

[21] Appl. No.: 33,164

[22] Filed: Mar. 16, 1993

[51] Int. Cl.$^5$ ............................................... A01K 1/00
[52] U.S. Cl. .................................... 119/735; 119/741; 119/743
[58] Field of Search ...................... 119/147.1, 148, 735, 119/729, 734, 737, 738, 739, 740, 741, 742, 743, 744, 745, 750

[56] References Cited

U.S. PATENT DOCUMENTS

| | | | |
|---|---|---|---|
| Re. 32,728 | 8/1988 | Albers, Sr. ........................... | 119/148 |
| 1,286,441 | 12/1918 | Stevenson . | |
| 1,360,941 | 11/1920 | Hanson . | |
| 2,522,188 | 9/1950 | Miller et al. ...................... | 119/147.1 |
| 3,152,577 | 10/1964 | Sheriff ................................ | 119/99 |
| 4,037,566 | 7/1977 | Albers ................................ | 119/148 |
| 4,051,813 | 10/1977 | Albers ................................ | 119/148 |
| 4,185,592 | 1/1980 | Albers, Sr. ........................ | 119/148 |
| 4,476,815 | 10/1984 | Albers, Sr. ........................ | 119/147 |
| 4,495,897 | 1/1985 | Albers, Sr. ........................ | 119/148 |
| 4,867,105 | 9/1989 | Hatfield ............................. | 119/148 |
| 4,930,452 | 6/1990 | DaSilveira ........................ | 119/148 |

FOREIGN PATENT DOCUMENTS

| | | | |
|---|---|---|---|
| 920692 | 11/1954 | Fed. Rep. of Germany ...... | 119/148 |
| 2446026 | 4/1976 | Fed. Rep. of Germany ...... | 119/148 |
| 2911431 | 9/1980 | Fed. Rep. of Germany . | |
| 2242929 | 5/1975 | France . | |
| 0646960 | 2/1979 | U.S.S.R. ............................. | 119/148 |

*Primary Examiner*—Gene Mancene
*Assistant Examiner*—Todd E. Manahan
*Attorney, Agent, or Firm*—Fulwider, Patton, Lee & Utecht

[57] ABSTRACT

Cattle stanchion apparatus in which a plurality of fixed and release stanchions define a row of head openings for animals, the release stanchions tending to pivot to open positions. Double latch fingers at the upper extremities of the release stanchions are engagable with notches carried by a rotatable and axially moveable positioner rod. An operating mechanism is actuable to move the positioner rod and engage the notches into and out of possible engagement with the latch fingers The arrangement gives the operator the capability of moving all of the release stanchions to closed positions to lock the animals in the feeding stalls, or allowing the animals individually to actuate the system to lock themselves in, or allowing the animals to enter and leave the stalls as they wish. The latch fingers are manually manipulatable to quickly and safely release downed cattle from individual feeding stalls.

6 Claims, 4 Drawing Sheets

CATTLE STANCHION APPARATUS

BACKGROUND OF THE INVENTION

The present invention relates to cattle stanchion apparatus, and more particularly to an improved cattle stanchion apparatus capable of actuation to quickly and easily release downed cattle. In Albers U.S. Pat. No. Re 32,728, there is shown cattle stanchion apparatus in which a plurality of fixed and release stanchions define a row of head openings for animals, the release stanchions tending to automatically pivot to open positions. Double latches at the upper extremities of the release stanchions are engagable by couplers carried by a rotatable and axially moveable positioner rod. An operating mechanism is actuable to axially move the positioner and engage the latches of the release stanchions to move them in unison, and an associated rotating mechanism is actuable to rotate the positioner and thereby move the couplers into and out of possible engagement of the latches. This arrangement gives the operator the capability of moving all of the release stanchions to closed positions to lock the animals in the feeding stalls, or allowing the animals individually to actuate the system to lock themselves in, or allowing the animals to enter and leave the stalls as they wish. The latches are manually manipulable to quickly release downed cattle from individual feeding stalls. Each release stanchion is provided with double latches and associated couplers which can be quickly and easily operated to allow movement of the individual release stanchions to enlarge the head opening and permit easy removal of a cow downed in the stall.

SUMMARY OF THE INVENTION

The present invention provides cattle stanchion apparatus having improvements over the cattle stanchion apparatus of U.S. Pat. No. Re 32,728. More particularly, the cattle stanchion apparatus of the present invention utilizes a horizontal rotatable and axially movable positioner rod provided with a pair of notches for engagement with two latch fingers carried by a bracket attached to the upper end of each release stanchion in place of the radially outwardly extending couplers utilized on the positioner in the Re 32,728 apparatus. Such improvement permits positive operation of the release stanchions in extreme temperature conditions without providing for longitudinal adjustment of the latch couplers. The improved arrangement also provides for quieter operation and the apparatus will undergo less wear and tear so as to provide a longer service life with less maintenance than previous cattle stanchion apparatus.

Other objects and advantages of the present invention will become apparent from consideration of the following detailed description taken in conjunction with the accompanying drawings.

DESCRIPTION OF A PREFERRED EMBODIMENT

Figure 1:
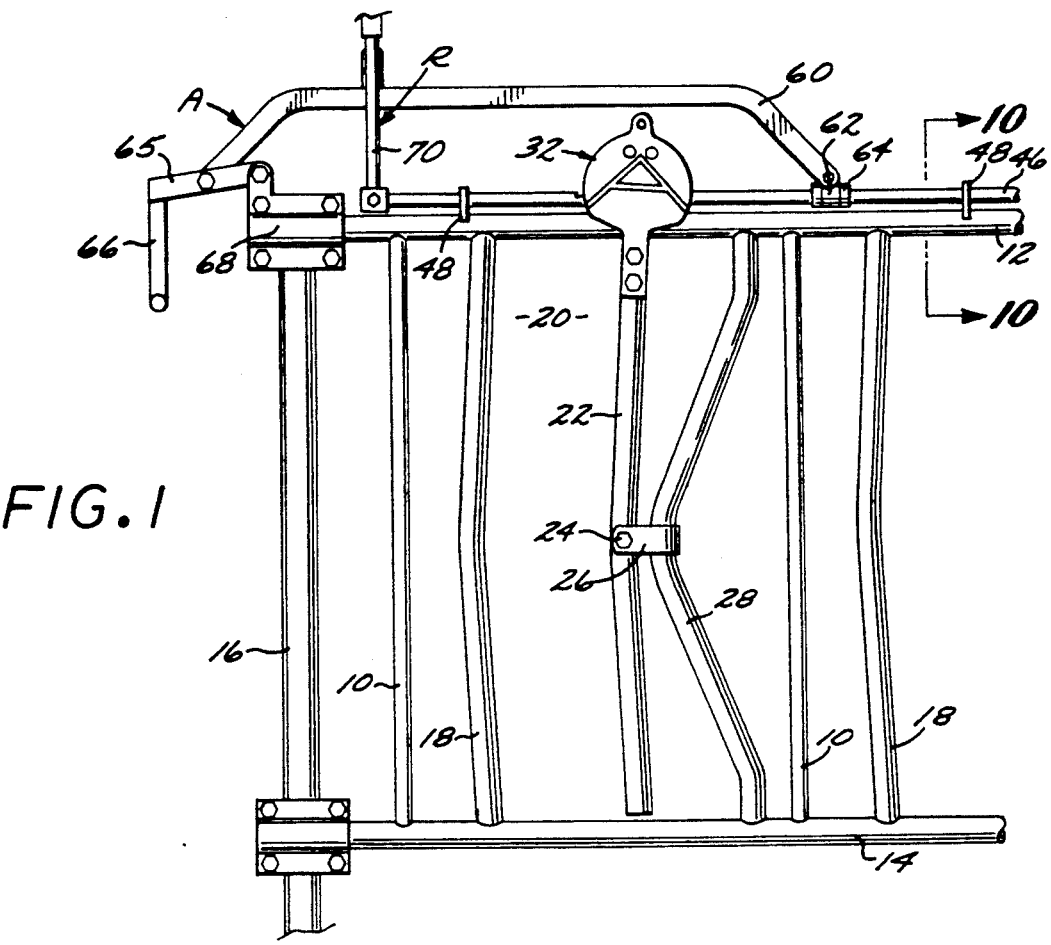
FIG. 1 is a front elevational view of one end of improved cattle stanchion apparatus embodying the present invention, illustrating the release stanchion in its locked position.

Referring now to the drawings, there is illustrated an improved cattle stanchion apparatus of the type in which a plurality of upright, horizontally spaced-apart bars 10 extend between, and a re welded to a tubular top rail 12 and a tubular bottom rail 14. The stanchion apparatus includes a plurality of tubular vertical end rails 16, only one of which is illustrated, which are secured to the ground or other supporting structure (not shown) at its lower end. At horizontally spaced intervals, larger tubular fixed stanchions 18, two of which are illustrated, are welded or otherwise rigidly secured at their upper and lower extremities to the top and bottom rails 12 and 14. Above its mid-portion, each stanchion 18 is preferably bent or offset to the left as shown in FIGS. 1-3 above its mid portion to thereby define a head opening 20 of generally uniform width from top to bottom, as seen in FIG. 1.

Although only one fixed stanchion 18 and release stanchion 22 are illustrated, it will be understood that the arrangement is repeated at regular intervals along the length of the stanchion apparatus frame to define as many head openings 20 as may be desired. Likewise, although the following disclosure is primarily limited to a description of the operation of the components of the one head opening 20, it will be understood that a plurality of many sets of such components are employed for the plurality of head openings.

Figure 2:
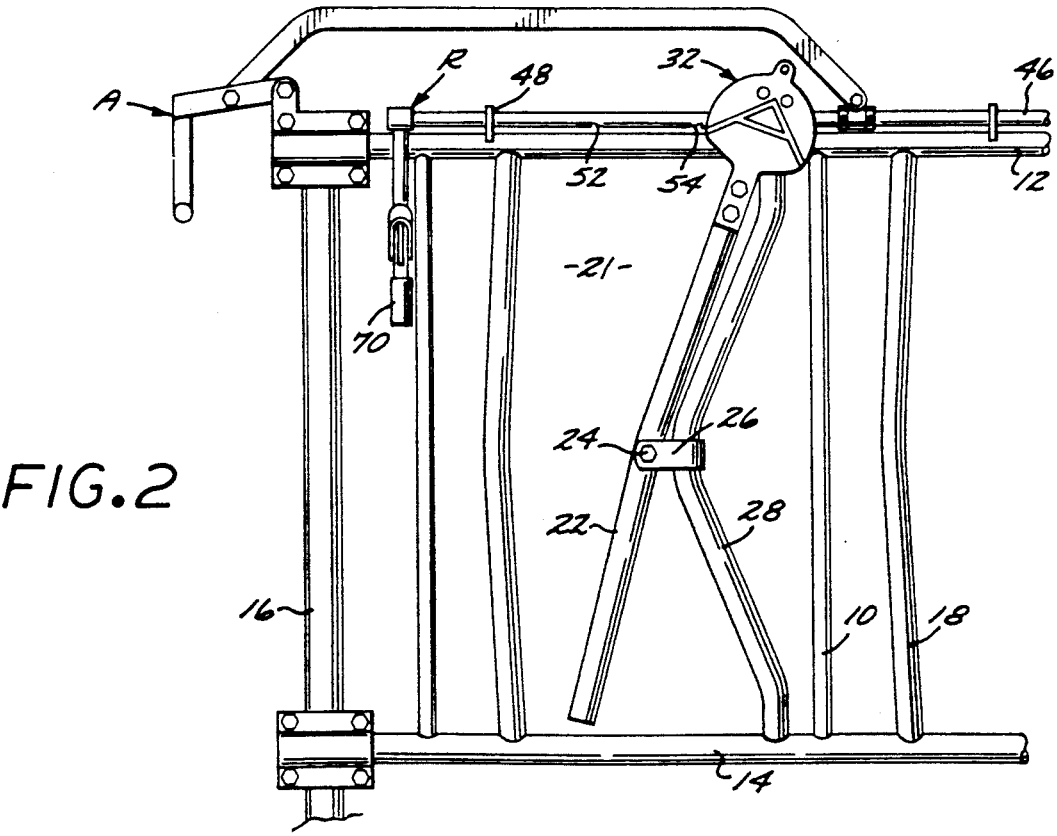
FIG. 2 is a view similar to FIG. 1, but showing the release stanchion in its open position.
Figure 3:
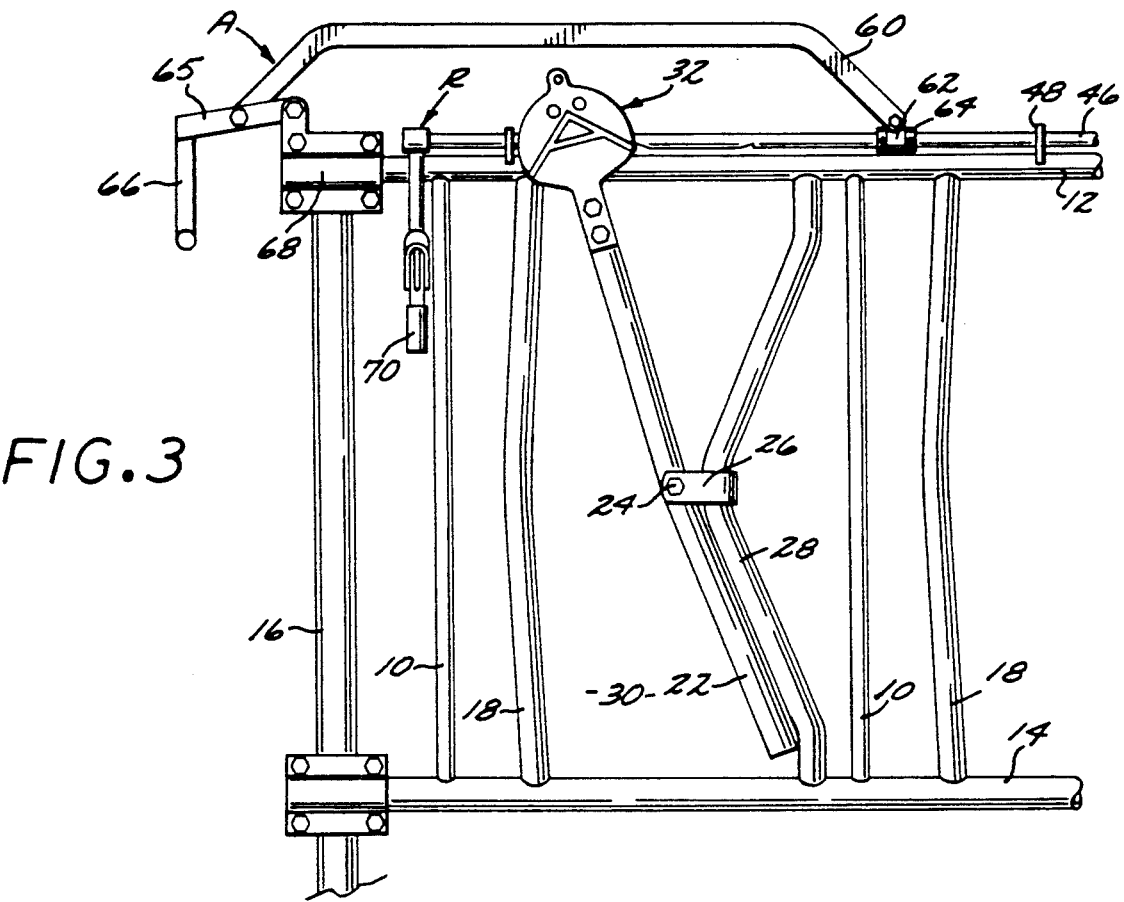
FIG. 3 is a view similar to FIG. 2, but showing the release stanchion in its downed cow position.
Figure 4:
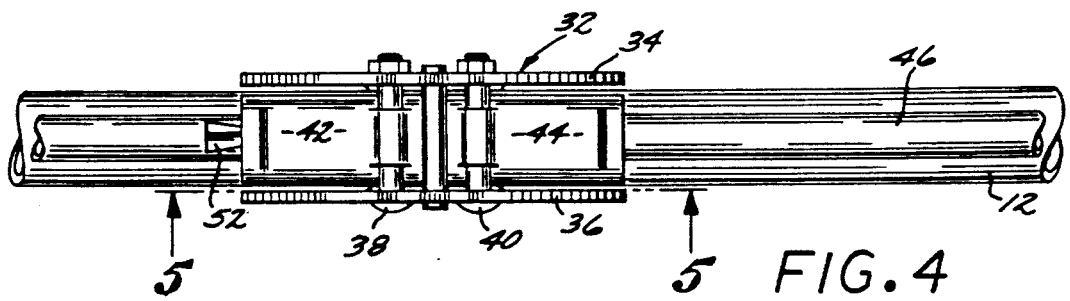
FIG. 4 is a fragmentary top plan view in enlarged scale of the locking bracket carried at the upper end of the release stanchion, including a pair of latch fingers.

Each release stanchion 22 is mounted for pivotal movement between a closed position as illustrated in FIG. 1 an open position as illustrated in FIG. 2, and a downed cow position shown in FIG. 3. In the embodiment illustrated, the release stanchion pivotal movement is about an axis located between the opposite extremities of the release stanchion, the axis being defined by a pivot bolt 24 carried by bracket 26. The bracket 26 is welded to a section of relatively heavy tubing 28 which is offset at approximately its mid-portion towards the head opening 20. The offset is preferably quite severe so as to define head opening 20 which, in the open position of the release stanchion, is relatively wide at its top and narrow in the middle. When the release stanchion 22 is in the downed cow position of FIG. 3, it will be seen that the configuration of the tubing 28 defines a relatively wide bottom opening 30.

The release stanchion 22 is preferably mounted below its mid-point and is kinked towards tubing 28 above pivot bolt 24 so that it will therefore pivot to and remain in its open position of FIG. 2 in the absence of any other constraint. Various other means may be provided to induce the tendency for the release stanchion to pivot to the open position of FIG. 2. In such open position of the release stanchion, the enlarged head opening 21 enables an animal to easily place its head through such opening for feeding from a feed trough (not shown) located on the other side of the stanchion apparatus.

When a cow places her head in the opening 20 and dips her head into the feed trough, the lower portion of the release stanchion 22 is engaged by the animals neck. This causes the release stanchion to pivot counterclockwise from its open position towards it closed position. As described hereinafter, the apparatus can be arranged to allow the release stanchion to pivot to its open position when the cow raises her head thereby freeing the animal to leave the feeding stall without any operator intervention. The apparatus can also be arranged to lock the release stanchion in its closed position so that operator intervention allows the animal to leave the stall.

Figure 5:
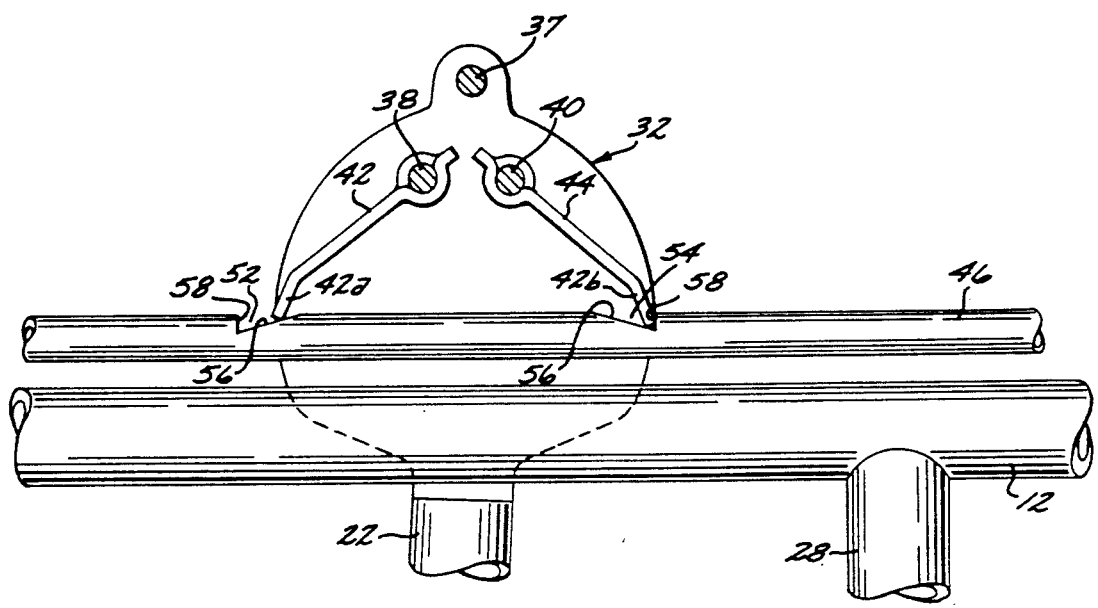
FIG. 5 is a fragmentary side elevational view taken along line 5—5 of FIG. 5, with the release stanchion in its locked position.
Figure 6:
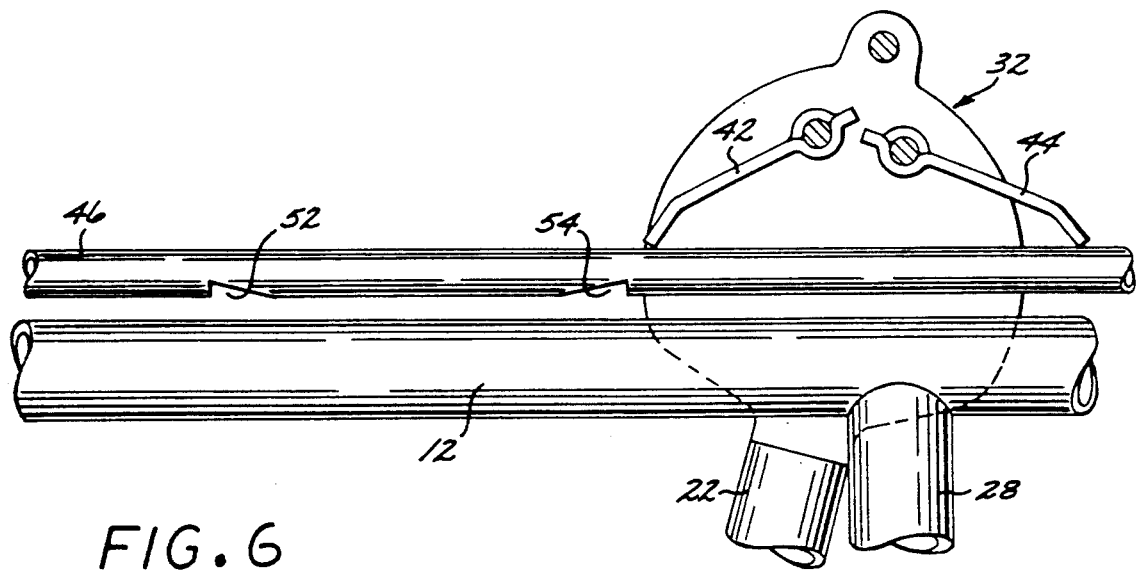
FIG. 6 is a fragmentary side elevational view similar to FIG. 5, but showing the release stanchion in its downed cow position.

A latching means is carried by the upper end of each release stanchion 22 comprising a generally annular bracket 32 defined by a pair of spaced apart like, vertical plates 34 and 36 bolted at their lower ends to the release stanchion and straddling opposite sides of the top rail 12, as shown in FIGS. 5 and 6. Pin 37 rigidly interconnects the upper ends of the bracket. Sufficient clearance is provided between the top rail 12 and the plates to enable the bracket 32 to move generally longitudinally relative to the top rail 12 during pivotal movement of the release stanchion 22. The upper portion of the brackets are provided with a pair of horizontal pins 38 and 40 which extend over the top of the top rail 12 and pivotally support the inner extremities, respectively, of a pair of elongated latch fingers 42 and 44. The lower portions of the latch fingers 42 and 44 extend inwardly towards one another at an acute angle relative to the main portion of such latch fingers, as shown particularly in FIGS. 5-8 at 42a and 42b.

The lower ends of the latch fingers 42 and 44 slide along an elongated, rotatable positioner rod 46 horizontally and axially slidably supported at intervals along its length by brackets 48 formed with an aperture 50 to receive the positioner rod 46. The lower ends of the brackets are welded to the upwardly-facing surface of the top rail 12. It should be understood that the latch fingers 42 and 44 fall of their own weight under the influence of gravity so that their lower extremities can drop into a pair of axially aligned, mirror-image notches 52 and 54 formed on the positioner rod 46. Each notch includes an outwardly and radially inwardly sloping entry surface 56 and a radially extending stop surface 58. When the positioner rod is moved axially and one of the latch fingers is disposed within one of the notches, the bracket 32, and hence, the release stanchion 22 will be moved in a pivot fashion by axial movement of the positioner rod. When, however, the positioner rod is rotated 180° from its position of FIG. 5 to its position of FIG. 6, the lower ends of the latch fingers will be free to slide relative to the upper surface of the positioner rod whereby the release stanchion is free to pivot between its various positions.

As shown in FIGS. 1, 2 and 3, axial movement of the positioner rod 46 is effected by a manually actuated operator assembly A. This type of assembly is described in detail in Albers U.S. Pat. No. 4,476,815, and reference is made to that patent for a fuller disclosure of its operation. However, in general, the operator assembly A comprises an elongated bar 60 pivotally connected at its right extremity to a cylindrical sleeve 62. The sleeve 62 is rotatably carried by the positioner rod 46 and is axially fixed in position by a pair of collars 64. The collars 64 are fixed to the positioner rod by conventional set screws (not shown) extending through the sleeve, and bearing against the outer surface of the positioner rod. The opposite or handle end of the bar 60 is pivotally connected between a pair of elongated links 65, only one of which is shown, which are each integrally secured at one end to a handle 66. The other end of each of the links 65 is pivotally secured to an upstanding pair of straps 68, only one of which is shown fixed to the top rail 12. Upward movement of the handle 66 from position illustrated in FIG. 1 axially moves the positioner rod 46 to the right from the retracted position of FIG. 1 to an extended position (not shown).

The positioner rod 46 is rotatable about its axis by a locking or rotating assembly R to move the notches 52 and 54 into and out of their upwardly-facing positions, and thus, in and out of the path of engagement with the lower ends of the latch fingers 42 and 44. This rotating assembly R is more particularly described in Albers U.S. Pat. No. 4,474,815. In general, the rotating assembly includes an elongated handle 70 that can be raised or lowered to rotate the positioner rod 46 through approximately a 180° angle. The handle 70 is welded at its inner end to an annular collar 72 fixed to the positioner rod 46 by a usual set screw (not shown).

In operation, the release stanchion 22 can locked in its closed position of FIG. I by disposing the notches 52 and 54 and latch fingers 42 and 44 in vertical alignment, as shown in FIGS. 1 and 5. At this point, the lower ends of the latch fingers will abut either of the stop surfaces 58 to block pivotal movement of the release stanchion. A cow cannot pivot the release stanchion open and the cows will therefore be locked in a position to be fed, milked or otherwise treated. If a dairyman wishes to permit the release stanchions 22 to move to their open position of FIG. 2, he may lower the handle 70 so as to rotate the positioner rod 46 from its first position of FIGS. 2 and 5 through an angle of 180° to a second position, and thereby dispose the notches 52 and 54 facing downwardly, as shown in FIG. 6. The lower ends of the latch fingers will then slide freely over the positioner rod and the cows can move the release stanchions to their open positions and freely enter and leave the feeding stalls as they like. Should a cow fall with the release stanchion 22 in its open position of FIGS. 2 and 6, the release stanchion will readily pivot counterclockwise to the position shown in FIG. 3, thereby preventing injury to the cow and permitting withdrawal of its head and neck from the stanchion apparatus. Should a cow fall while the release stanchion 22 is in its locked position of FIGS. 1 and 5, the dairyman can readily pivot the handle 70 so as to rotate the positioner rod 46 through an angle of 180° to thereby position the notches 52 and 54 facing downwardly. The release stanchion 22 will then be free to pivot to its cow down position of FIG. 3. If the dairyman is not positioned within the vicinity of the handle 70, or if he does not wish other cows to be free to leave the stanchion apparatus, he can manually lift the latch finger 42 out of its notch 52, and the release stanchion will be free to rotate counterclockwise to its cow down position of FIG. 3 so as to safely permit withdrawal of the downed cow.

Figure 7:
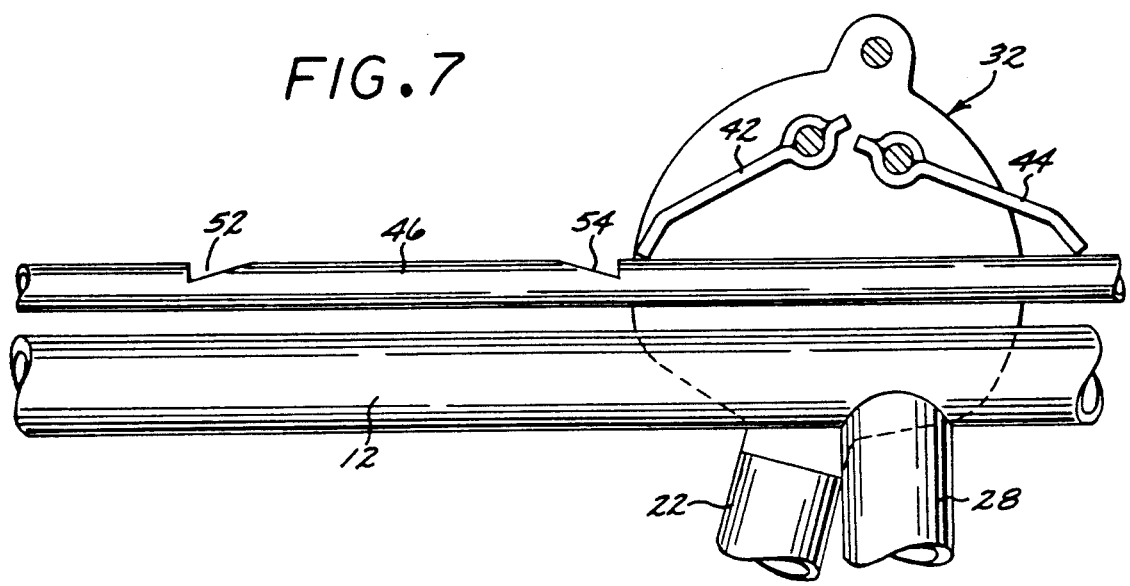
FIG. 7 is a fragmentary side elevational view similar to FIG. 6 showing the positioner rod in its locking position.
Figure 8:
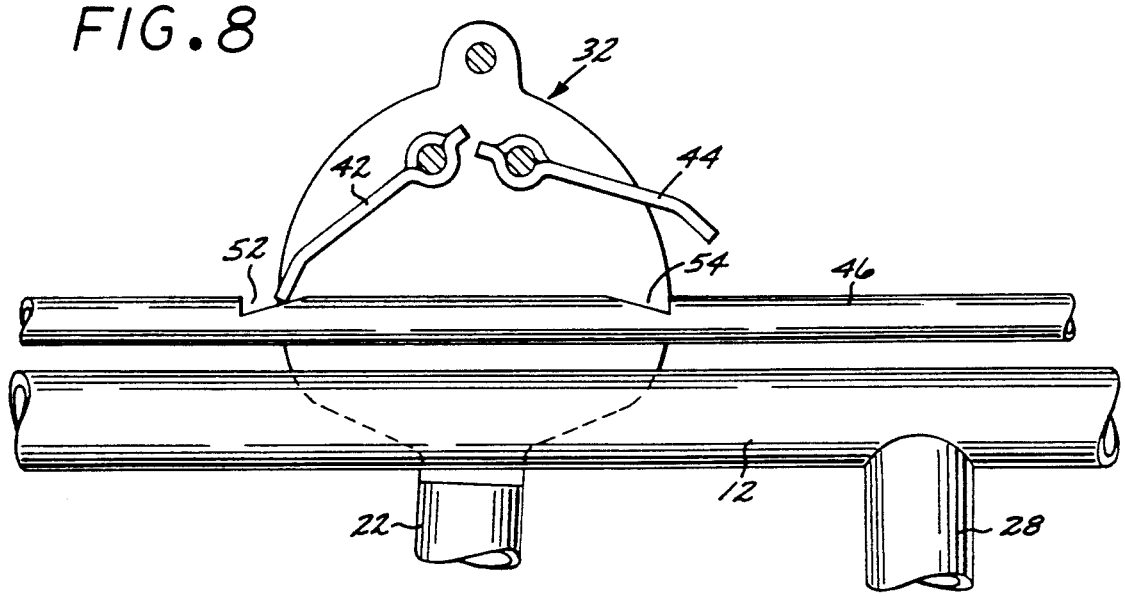
FIG. 8 is a view similar to FIG. 7 showing how the release stanchion can be manually released for movement to an open position.
Figure 9:
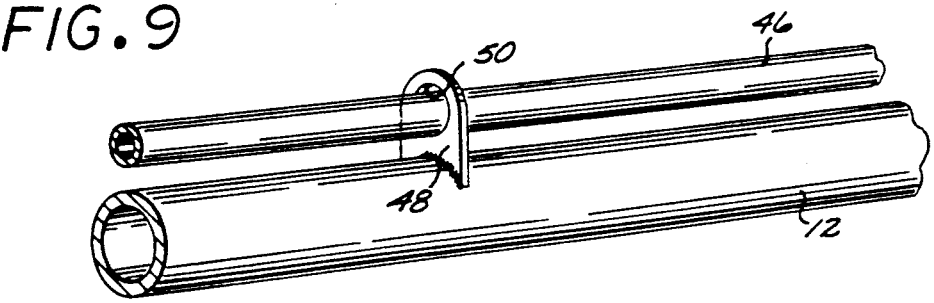
FIG. 9 is a perspective view showing how the positioner rod is carried by the top rail of the stanchion apparatus.

Referring now to FIG. 7, where the release stanchion 22 is in its open position and the dairyman wishes to lock the cows into the stanchion apparatus, the positioner rod 46 is rotated so that the notches 52 and 54 face upwardly. As a cow lowers its neck into the lower portion of space 20 of FIG. 2, the release stanchion 22 will pivot counterclockwise until the latch fingers 42 and 44 drop into the now upwardly-facing notches 52 and 54, thereby securing the release stanchions in their locked position. Referring now to FIG. 8, should the dairyman wish to release a single cow while the other cows remain locked in the stanchion apparatus, he need only lift the right-hand latch finger 44 out of its notch 54, and the release stanchion can be pivoted clockwise to its open position of FIG. 2.

It should be particularly noted that where a lengthy array of stanchion apparatus is employed, the positioner rod 46 may be of such a length as to undergo considerable expansion and contraction upon extreme temperature changes. The provision of the sloping entry surface 56 of the notches permit effective operation of the apparatus even during such elongation or contraction of the positioner rod, since the lower end of the latch fingers can slide along such sloping surfaces as the positioner rod 46 expands and contracts. It should be understood that the relative spacing between the notches 52 and 54, and the lower ends 42a and 42b of the latch fingers provide a tolerance to accommodate the thermal expansion and contraction of the positioner rod. With this arrangement, it is not necessary to utilize means for adjusting such relative spacing, as with the stanchion apparatus of Albers U.S. Pat. No. Re 32,728. Additionally, because of the freely sliding connection between the latch fingers and the notches, the operation of the release stanchions is quieter and less subject to wear and tear than prior art stanchion apparatus so as to achieve a longer service life with minimum maintenance. It should likewise be noted that by configuring the lower portions of latch fingers 42 and 44 inwardly at an acute angle relative to the main portion of the latch fingers, a more positive latch operation is obtained for a given length of the latch fingers.

Various modifications and changes may be made with respect to the foregoing description without departing from the spirit of the present invention.

I claim:

1. In cattle stanchion apparatus including fixed and release stanchions laterally spaced apart to define a head opening for an animal; fixed structure including mounting means mounting said release stanchion for pivotal movement from an open position in which the upper part of said head opening is enlarged to enable an animal to place its head through said opening, to a closed position in which said upper part of said head opening is narrowed to hold the animal's head in said opening, and beyond said closed position to a downed cow position in which said upper part of said opening is further narrowed and wherein the lower part of said opening is enlarged to enable a downed cow to withdraw its head; and a generally horizontally extending axially slidable positioner rod rotatable about its longitudinal axis between a first position and a second position; the improvement comprising:

a bracket secured to the upper end of said release stanchion;

a pair of latch fingers having their upper ends pivotally attached to said bracket, with their lower ends slidable along the upwardly-facing surface of said positioner rod; and a pair of axially aligned notches formed on one surface of said positioner rod to releasably receive the lower end of said latch fingers to transfer axial movement of said positioner rod to the upper end of said release stanchion when said positioner rod is in said first position, with the lower end of said latch fingers being free to slide along said positioner rod when said rod is rotated to said second position wherein said notches are out of alignment with the lower end of said notches whereby said release stanchion may automatically then pivot to either its open or to its downed cow position as a cow's neck lowers its neck into the lower part of said opening thereby preventing injury to the cow, and with the lower end of one of the latch fingers being selectively removable from its respective notch to free said release stanchion for manual pivotal movement to its downed cow position even when said positioner rod is in its first position.

2. Cow stanchion apparatus as set forth in claim 1, wherein the lower end of the other of said latch fingers is selectively removable from its respective notch to free said release stanchion for pivotal movement into its open position even when said positioner rod is in its first position to permit a cow to withdraw from the stanchion apparatus.

3. Cow stanchion apparatus as set forth in claim 2, wherein said notches define mirror images of one another and include an outwardly and radially inwardly sloping entry surface and a radially extending stop surface.

4. Cow stanchion apparatus as set forth in claim 1, wherein the lower ends of said latch fingers extend inwardly at an acute angle towards one another relative to the main portion of such fingers.

5. Cow stanchion apparatus as set forth in claim 4, wherein said notches define mirror images of one another and include an outwardly and radially inwardly sloping entry surface and a radially extending stop surface.

6. In cattle stanchion apparatus including fixed and release stanchions laterally spaced apart to define a head opening for an animal; fixed structure including mounting means mounting said release stanchion for pivotal movement from an open position in which the upper part of said head opening is enlarged to enable an animal to place its head through said opening, to a closed position in which said upper part of said head opening is narrowed to hold the animal's head in said opening, and beyond said closed position to a downed cattle release position in which said upper part of said opening is further narrowed and wherein the lower part of said opening is enlarged to enable a downed animal to withdraw its head, said release stanchion being supported and arranged to fall into said open position upon any movement of said release stanchion from said closed position toward said open position, and a generally horizontally extending positioner rod longitudinally moveable between extended and retracted positions, and pivotable about a longitudinal axis between a first position and a second position; the improvement comprising:

a bracket secured to the upper end of said release stanchion;

a pair of latch fingers having their upper end pivotally attached to said bracket, with their lower ends slidable along the upwardly-facing surface of said positioner rod, and with the lower end of said latch fingers extending inwardly at an acute angle relative to the main portion of such fingers;

a pair of axially aligned notches formed on one surface of said positioner rod to releasably receive the lower end of said fingers to transfer axial movement of said positioner rod to the upper end of said release stanchion when said positioner rod is in said first position, with the lower end of said latch fingers being free to slide along said positioner rod when said rod is rotated to said second position wherein said notches are out of alignment with the lower end of said notches whereby said release stanchion may pivot to either its open or its downed cow position; and wherein said notches define mirror images of one another and include an outwardly and radially inwardly sloping entry surface and a radially extending stop surface.

* * * * *